(12) United States Patent
Ishiwatari

(10) Patent No.: US 6,688,508 B2
(45) Date of Patent: Feb. 10, 2004

(54) CONVEYOR DEVICE

(75) Inventor: Takashi Ishiwatari, Tokyo (JP)

(73) Assignee: Kabushiki Kaisha Bridgestone, Tokyo (JP)

(*) Notice: Subject to any disclaimer, the term of this patent is extended or adjusted under 35 U.S.C. 154(b) by 0 days.

(21) Appl. No.: 10/233,411

(22) Filed: Sep. 4, 2002

(65) Prior Publication Data

US 2003/0062247 A1 Apr. 3, 2003

(30) Foreign Application Priority Data

Sep. 6, 2001 (JP) ............................. 2001-270554

(51) Int. Cl.⁷ ............................................. B65H 20/30
(52) U.S. Cl. ........................... 226/118.1; 226/118.2; 226/170
(58) Field of Search .................... 226/118.1, 118.2, 226/170

(56) References Cited

U.S. PATENT DOCUMENTS 2,141,578 A * 12/1938 Wellmar .................... 226/170
3,127,079 A *  3/1964 Allander .................. 226/118.1
6,215,205 B1 *  4/2001 Banas et al. ............. 226/118.2

FOREIGN PATENT DOCUMENTS

GB        335-657 A      10/1930
GB        1-133-983 A    11/1968
SU        1-558-775 A     4/1990
WO        WO 98/05580 A1  2/1998

* cited by examiner

Primary Examiner—Joseph E. Valenza
(74) Attorney, Agent, or Firm—Sughrue Mion, PLLC

(57) ABSTRACT

A conveyor device capable of conveying a belt-like material from a lower site to an upper site without elongating the belt-like material and without applying unrequired stress thereto.

The conveyor device comprises a lower conveyor unit for conveying the belt-like material supplied from material supply means, a central conveyor unit having an induction conveyor which is located adjacent to the front end of the lower conveyor unit and has at least one end movable in a vertical direction, a central conveyor having an inversion conveyor and an expansion conveyor disposed above the lower conveyor unit along a horizontal path, and a unit for expanding or contracting the above expansion conveyor, for inverting the belt-like material received from the above lower conveyor unit and conveying it in an upward direction. Therefore, the belt-like material can be thereby conveyed in an upward direction while the above expansion conveyor is expanded or contracted to increase or reduce the conveyance path of the belt-like material.

4 Claims, 4 Drawing Sheets

CONVEYOR DEVICE

BACKGROUND OF THE INVENTION

1. Field of the Invention

The present invention relates to a conveyor device for conveying a belt-like material and, particularly, to a conveyor device capable of conveying a belt-like material by keeping stress applied to the belt-like material at a constant level even when the conveyance speed is changed.

2. Description of the Prior Art

In the prior art, when the conveyance speed on the transmitting side or receiving side is changed or intermittent delivery occurs for the convenience of a line at the time of conveying a belt-like material, a vertical loop type suspension conveyor as shown in FIG. 4 is used as conveyor means capable of adjusting the length of the conveyance path of the above belt-like material. Since the above belt-like material 1 is not supported between the transmitting conveyor 51 and the receiving conveyor 52, it is slackened and the amount of the slack is changed to adjust the length of the conveyance path of the belt-like material when the speed $V_1$ of the transmitting conveyor 51 and the speed $V_2$ of the receiving conveyor 52 becomes different from each other.

This method has an advantage that a change in the delivery speed of the belt-like material 1 can be handled with a simple structure. However, when the belt-like material 1 is a rubber member, it elongates by its own weight. Therefore, it is not preferred that this method be used to convey a rubber member which can be easily transformed, such as an unvulcanized rubber member for a tread extruded from an extrusion molding machine. Accordingly, the delivery of the belt-like material must be controlled by starting or stopping extrusion from the extrusion molding machine so that the belt-like material 1 should not elongate.

To cope with this problem, there is proposed a conveyor device 60 as shown in FIG. 5, which comprises a conveyor movable along a horizontal path and can convey a belt-like material 1 in such a state that the belt-like material 1 does not elongate and unrequired stress is not applied even when the extrusion speed from the extrusion molding machine is constant (for example, Japanese Patent Publication 2000-515473). The belt-like material 1 conveyed by an upper conveyor 61 which comprises a first conveyor belt 61b driven by drive means 61a and delivered at a predetermined rate $V_1$ from an unshown feeder such as an extrusion molding machine is sent to a lower conveyor 63 which comprises a third conveyor belt 63b driven by drive means 63a through a central conveyor 62 which is a movable conveyor and supplied to a device such as a belt-like material processor. When the conveyance speed $V_2$ of the lower conveyor 63 is lower than the conveyance speed $V_1$ of the upper conveyor 61 and the belt-like material 1 is slacked by a reduction in tension shown by a broken line in FIG. 5, the above slack is detected by an optical sensor 64 installed near the front end 62F of the above central conveyor 62 and eliminated by adjusting the length of the belt-like material 1 by driving an unshown actuator incorporated in a servo unit 66 controlled by a controller 66 to move the above central conveyor 62 in a direction shown by an arrow B in FIG. 5. Even when the conveyance speed $V_2$ of the lower conveyor 63 differs from the conveyance speed $V_1$ of the upper conveyor 61, the belt-like material 1 can be thereby conveyed from an upper site to a lower site without being elongated.

However, in the above conventional conveyor device 60, the belt-like material 1 is simply descended to the lower conveyor 63 over the front end 62F of the central conveyor 62 to be carried on the lower conveyor 63. Thus, the belt-like material 1 can be conveyed from an upper site to a lower site in structure in the prior art. Therefore, the development of a conveyor device which can convey the belt-like material 1 from a lower site to an upper site without applying unrequired stress to the belt-like material 1 when the extruded tread is pulled up from a cooling water tank and conveyed to the molding step of laminating it with another member such as a cord, bead or belt is desired.

It is an object of the present invention which has been made in view of the above problem of the prior art to provide a conveyor device capable of conveying a belt-like material from a lower site to an upper site without elongating the belt-like material to be conveyed and applying unrequired stress thereto.

SUMMARY OF THE INVENTION

According to a first aspect of the present invention, there is provided a conveyor device comprising:

a first conveyor for conveying a belt-like material supplied from material supply means;

a second conveyor, comprising an inversion conveyor and a unit for expanding or contracting an expansion conveyor along a horizontal path above the first conveyor, for inverting the belt-like material received from the first conveyor and conveying it in an upward direction; and an induction conveyor interposed between the first conveyor and the second conveyor and having at least one end movable in a vertical direction.

Since the belt-like material can be thereby conveyed in an upward direction while the length of the conveyance path is increased or reduced, it can be conveyed from a lower site to an upper site without being elongated and without applying unrequired stress thereto.

According to a second aspect of the present invention, there is provided a conveyor device which further comprises a third conveyor, comprising an induction conveyor having at least one end movable in a vertical direction and an inversion conveyor above the second conveyor, for inverting the belt-like material received from the second conveyor and conveying it in an upward direction. Thus, the belt-like material inverted by the second conveyor is returned to its first delivery state and conveyed in an upward direction.

According to a third aspect of the present invention, there is provided a conveyor device wherein the belt of the expansion conveyor is suspended by an upper intermediate roller and a lower intermediate roller interposed between main rollers, and only the main roller, the upper intermediate roller and the inversion roller are made movable to expand or contrast the expansion conveyor. Thereby, the belt-like material can be conveyed to the conveyor unit in the latter stage smoothly.

The above and other objects, features and advantages of the present invention will become apparent from the following description taken into connection with the following drawings.

DETAILED DESCRIPTION OF THE PREFERRED EMBODIMENT

A preferred embodiment of the present invention will be described hereinbelow with reference to the accompanying drawings.

Figure 1:
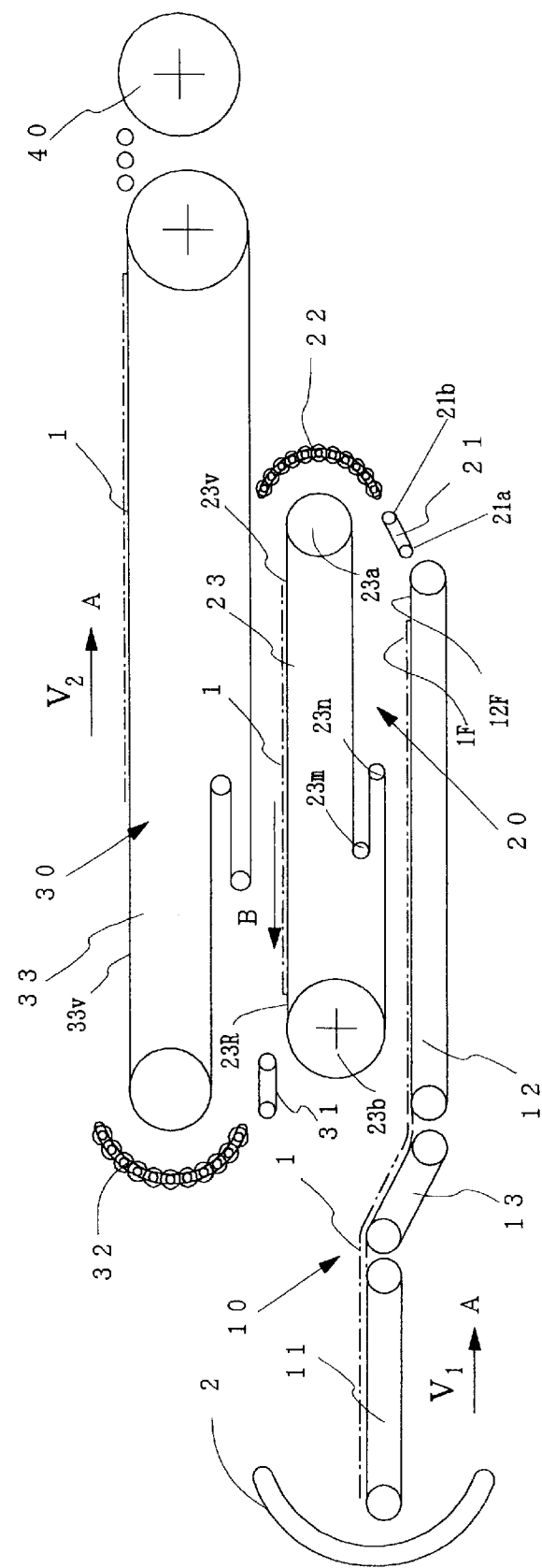
FIG. 1 is a diagram showing the constitution of a conveyor device according to an Embodiment of the present invention.

FIG. 1 is a diagram showing the constitution of a conveyor device according to an embodiment of the present invention. This conveyor device comprises a lower conveyor unit 10 which is a first conveyor for conveying a belt-like material 1 supplied from material supply means 2, a central conveyor unit 20 which is a second conveyor for inverting the belt-like material 1 from the lower conveyor unit 10 and conveying it in an upward direction, and an upper conveyor unit 30 which is a third conveyor for re-inverting the belt-like material 1 from the above central conveyor unit 20 and conveying it to a molding drum 40 which is one of belt-like material processing equipment. Thus, this conveyor device conveys the above belt-like material 1 from a lower site to an upper site.

The lower conveyor unit 10 comprises two conveyors 11 and 12 for conveying the above belt-like material 1 in a horizontal direction and a lifting conveyor 13 interposed between the conveyors 11 and 12 and conveys the belt-like material 1 supplied from the material supply means 2 at a predetermined speed $V_1$ in a direction shown by an arrow A in FIG. 1.

Figure 2:
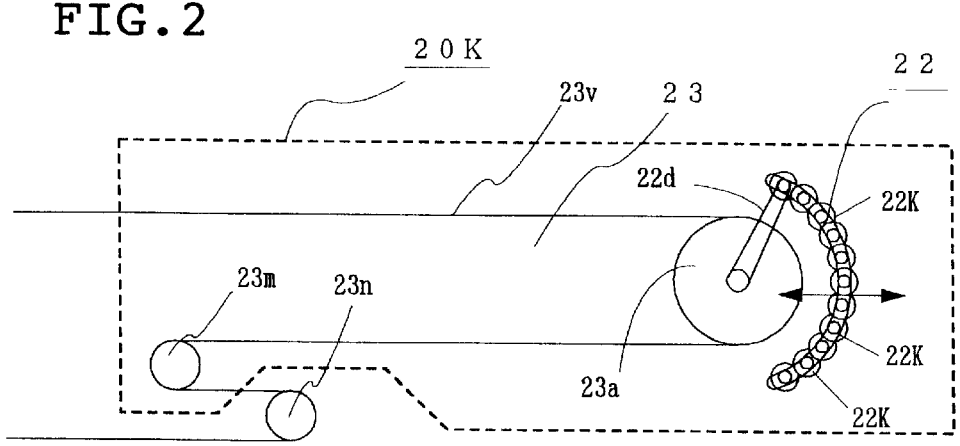
FIG. 2 is a diagram showing the movable portion of the conveyor device according to the Embodiment of the present invention.

The central conveyor unit 20 is located on the front end 12F side of the conveyor 12 of the above lower conveyor unit 10 and comprises an induction conveyor 21 having a vertically movable end 21b on the opposite side to the above front end 12F, an inversion conveyor 22 disposed at the end of the induction conveyor 21, and a central conveyor 23 having an expansion conveyor belt 23v suspended by an upper intermediate roller 23m and a lower intermediate roller 23n interposed between main rollers 23a and 23b. Thus, the central conveyor unit 20 inverts the belt-like material 1 from the above lower conveyor unit 10 and conveys it in an upward direction. As shown in FIG. 2, the above inversion conveyor 22 has a plurality of brimmed rollers 22k arranged in a substantially circular arc form, connected to the central conveyor 23 by a belt 22d and turned by the rotation of the above main roller 23a. In the above central conveyor unit 20, parts enclosed by a broken line in FIG. 2, that is, the main roller 23a of the central conveyor 23, the upper intermediate roller 23m and the inversion conveyor 22 are all displaced in a direction shown by an arrow in FIG. 2 to expand or contract the expansion conveyor belt 23v.

The constitution of the upper conveyor unit 30 is almost the same as the above central conveyor unit 20. That is, the belt-like material 1 received from the rear end of the central conveyor 23 through an induction conveyor 31 is inverted by an inversion conveyor 32 and re-inverted by an upper conveyor 33 having an expansion conveyor belt 33v to be returned to its first delivery state.

A description is subsequently given of the operation of the conveyor device of the present invention.

First, the belt-like material 1 supplied from the material supply means 2 is conveyed by the conveyor 11, lifting conveyor 13 and conveyor 12 of the lower conveyor unit 10 in the direction shown by the arrow A in FIG. 1 continuously at a predetermined speed $V_1$ corresponding to the delivery speed of the above material supply means 2 and guided to the inversion conveyor 22 by the induction conveyor 21 at the front end 12F of the conveyor 12.

Figure 3A:
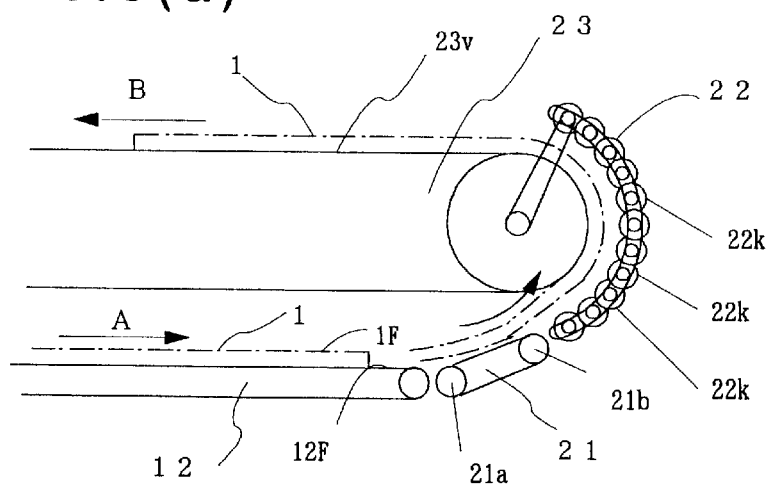
FIG. 3 is a diagram for explaining the operation of the movable portion of the conveyor device according to the Embodiment of the present invention.

At this point, as shown in FIG. 3(a), the end portion 21b on the opposite side of the above front end 12F of the above induction conveyor 21 rises toward the inversion conveyor 22 and guides the front end portion 1F of the belt-like material 1 supplied from the above conveyor 12 to the inversion conveyor 22. The belt-like material 1 is guided by the brimmed rollers 22k arranged in a circular arc form to be inverted by the inversion conveyor 22 and placed on the expansion conveyor belt 23v of the central conveyor 23 to be carried on the above expansion conveyor belt 23v in a direction shown by an arrow B in FIG. 3(a).

Thereafter, the belt-like material 1 is supplied to the inversion conveyor 32 by the induction conveyor 31 of the upper conveyor unit 30 from the rear end 23R of the central conveyor 23 to be inverted and returned to its first delivery state, and carried on the expansion conveyor belt 33v in the direction shown by the arrow A in FIG. 1.

Figure 3B:
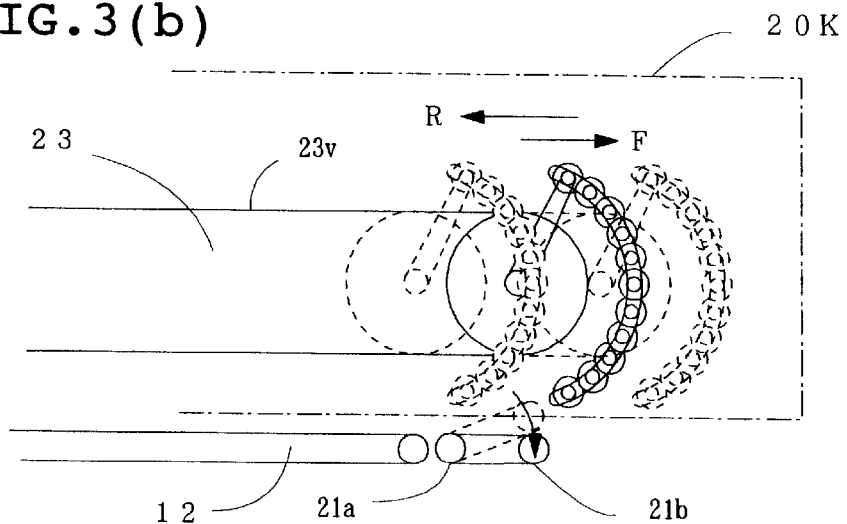
Figure 4:
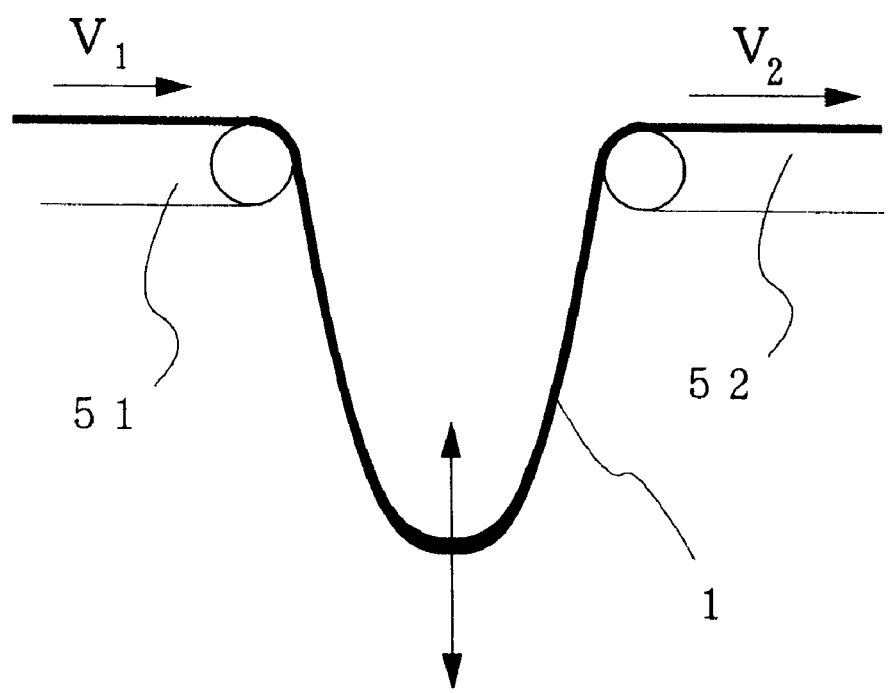
FIG. 4 is a diagram of a vertical loop type suspension conveyor of the prior art.

When the conveyance speed $V_2$ of the upper conveyor unit 30 becomes different from the conveyance speed $V_1$ of the lower conveyor unit 10 (generally $V_2 < V_1$) or when the conveyance of the upper conveyor unit 30 becomes intermittent, the belt-like material 1 is slacked by a reduction in tension as described above. To cope with this, in this embodiment, as shown in FIG. 3(b), the above movable portion 20K is displaced in a direction shown by an arrow F in FIG. 3(b) to expand the elastic conveyor belt 23v in order to increase the length of the path of the belt-like material 1, thereby eliminating the slack of the belt-like material 1. Thereby, the belt-like material 1 can be conveyed from a lower site to an upper site without being elongated and without applying unrequired stress thereto. At the time of the above expansion operation, the above end portion 21b on the inversion conveyor 22 side of the induction conveyor 21 is lowered to the same height as the other end 21a.

When the conveyance speed of the upper conveyor unit 20 becomes higher and reaches $V_1$ or when the conveyance of the belt-like material 1 becomes continuous, the above movable portion 20K is displaced in a direction shown by an arrow R in FIG. 3(b) to reduce the length of the expansion conveyor belt 23v, thereby eliminating a change in tension to be applied to the belt-like material caused by the above change in speed.

Thus, the conveyor device of this embodiment displaces the movable portion 20K of the central conveyor unit 20 including the inversion conveyor 22 in the horizontal direction in response to a change in the delivery speed of the belt-like material 1 to convey the belt-like material 1 in an upward direction while the length of the conveyance path is increased or reduced. Therefore, the belt-like material 1 can be conveyed from a lower site to an upper site without being elongated and without applying unrequired stress thereto.

Figure 5:
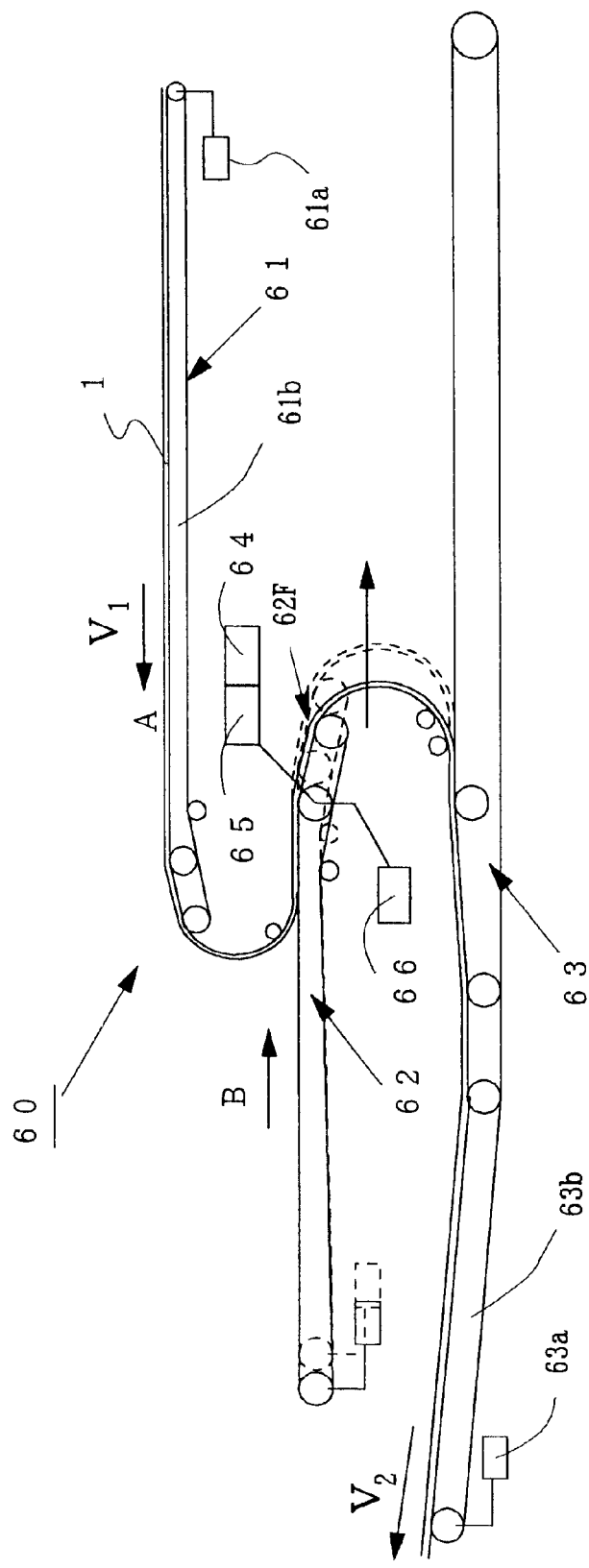
FIG. 5 is a diagram showing an example of a conveyor device comprising a movable conveyor of the prior art.

In the conveyor device of this embodiment, only the main roller 23a, the upper intermediate roller 23m of the central conveyor 23 and the inversion conveyor 22 are movable unlike the device of the prior art shown in FIG. 5 in which the entire central conveyor 62 is movable. Therefore, the rear end 23R of the central conveyor 23 is always brought into close contact with the induction conveyor 31 of the upper conveyor unit 30, whereby the belt-like material 1 can be carried to the upper conveyor unit 30 smoothly.

In order to eliminate a slack in the belt-like material 1 more quickly and more accurately in this embodiment, the upper conveyor unit 30 is constituted the same as the above central conveyor unit 20 to increase or reduce the length of the path in two stages. Even when the upper conveyor 33 of the above upper conveyor unit 30 is fixed like the conveyors 11 and 12 of the lower conveyor unit 10, the belt-like material 1 can be conveyed in an upward direction sufficiently while the length of the conveyance path of the belt-like material 1 is increased or reduced.

As having been described above, the conveyor device of the present invention comprises a first conveyor for conveying a belt-like material supplied from material supply means, a second conveyor, comprising an inversion conveyor and a unit for expanding or contracting an expansion conveyor disposed above the first conveyor along a horizontal path, for inverting the belt-like material received from the above first conveyor and conveying it in an upward direction, and an induction conveyor interposed between the first conveyor and the second conveyor and having at least one end movable in a vertical direction so that the belt-like material can be conveyed in an upward direction while the length of the conveyance path of the belt-like material is increased or reduced. Therefore, the belt-like material can be conveyed from a lower site to an upper site without being elongated and without applying unrequired stress thereto.

Since the conveyor device further comprises a third conveyor, comprising an induction conveyor movable in a vertical direction and an inversion conveyor above the second conveyor, for inverting the belt-like material received from the above second conveyor and conveying it in an upward direction, the belt-like material inverted by the second conveyor can be returned to its first delivery state and conveyed in an upward direction.

Since the belt of the above expansion conveyor is suspended by the upper intermediate roller and the lower intermediate roller interposed between the main rollers and only the main roller, the upper intermediate roller and the inversion roller are made movable to expand or contract the above expansion conveyor, the belt-like material can be conveyed to the conveyor unit in the latter stage such as the third conveyor unit smoothly.

What is claimed is:

1. A conveyor device comprising:

a first conveyor for conveying a belt-like material supplied from material supply means;

a second conveyor, comprising an inversion conveyor and a unit for expanding or contracting an expansion conveyor disposed above the first conveyor along a horizontal path, for inverting the belt-like material received from the first conveyor and conveying it in an upward direction; and an induction conveyor interposed between the first conveyor and the second conveyor and having at least one end movable in a vertical direction.

2. The conveyor device of claim 1 which further comprises a third conveyor, comprising an induction conveyor having at least one end movable in a vertical direction and an inversion conveyor above the second conveyor, for inverting the belt-like material received from the second conveyor and conveying it in an upward direction.

3. The conveyor device of claim 1, wherein the belt of the expansion conveyor is suspended by an upper intermediate roller and a lower intermediate roller interposed between main rollers, and only the main roller, the upper intermediate roller and the inversion roller are made movable to expand or contrast the expansion conveyor.

4. The conveyor device of claim 2, wherein the belt of the expansion conveyor is suspended by an upper intermediate roller and a lower intermediate roller interposed between main rollers, and only the main roller, the upper intermediate roller and the inversion roller are made movable to expand or contrast the expansion conveyor.

* * * * *